United States Patent [19]
Noya et al.

[11] Patent Number: 5,309,451
[45] Date of Patent: May 3, 1994

[54] DATA AND PARITY PREFETCHING FOR REDUNDANT ARRAYS OF DISK DRIVES

[75] Inventors: Eric S. Noya, Groton; Randy M. Arnott, Clinton; Mitchell N. Rosich, Groton, all of Mass.

[73] Assignee: Digital Equipment Corporation, Maynard, Mass.

[21] Appl. No.: 929,080

[22] Filed: Aug. 12, 1992

[51] Int. Cl.$^5$ ............................................. G06F 11/00
[52] U.S. Cl. .................. 371/40.4; 371/10.1; 395/425
[58] Field of Search ............ 371/40.4, 10.1, 10.2, 371/40.1; 395/575, 425

[56] References Cited

U.S. PATENT DOCUMENTS

| | | |
|---|---|---|
| 4,437,155 | 3/1984 | Sawyer et al. . |
| 4,489,378 | 12/1984 | Dixon et al. . |
| 4,636,946 | 1/1987 | Hartung et al. . |
| 4,882,642 | 11/1989 | Tayler et al. . |
| 4,972,316 | 11/1990 | Dixon et al. . |
| 4,972,364 | 11/1990 | Barrett et al. . |
| 5,109,485 | 4/1992 | Smith, Jr. . |
| 5,109,500 | 4/1992 | Iseki et al. . |
| 5,124,987 | 6/1992 | Milligan et al. ................. 371/10.1 |
| 5,163,131 | 11/1992 | Row et al. ........................ 395/200 |
| 5,263,145 | 11/1993 | Brady et al. ..................... 395/425 |

Primary Examiner—Vincent P. Canney
Attorney, Agent, or Firm—Albert P. Cefalo; Dirk Brinkman

[57] ABSTRACT

A method for prefetching the data and parity blocks for generating parity data of a stripe. The method uses a low and high thresholds marker indicative of a first and second level of fullness of the cache to determine whether or not to prefetch the data and parity blocks. If the cache is filled to a level exceeding the first level of fullness, the data and parity blocks are prefetched for any blocks to be written to the disk drive between the low and high threshold. The data and parity blocks are read from the disk drive at a lower processing priority in anticipation of the writing of the block.

10 Claims, 4 Drawing Sheets

DATA AND PARITY PREFETCHING FOR REDUNDANT ARRAYS OF DISK DRIVES

FIELD OF THE INVENTION

This invention relates to the control of multiple inexpensive disk drives for use with a computer system, and more particularly to a system for generating parity data for multiple disk drives.

BACKGROUND TO THE INVENTION

It is a problem in the field of computer systems to provide an inexpensive, high performance, high reliability, and high capacity disk storage device. Traditional high performance and high capacity disk devices have typically used single large expensive disks (SLED) having form factors in the range of 12 or 14 inches.

The rapid acceptance of personal computers has created a market for inexpensive small form factor drives, such as 5¼, 3½ inch, or smaller. Consequently, a disk storage device comprising a redundant array of inexpensive disks (RAID) has become a viable alternative for storing large amounts of data.

RAID products substitute many small disk drives for a few large expensive disks to provide higher storage capacities. The drawback to replacing a single large disk with, for example, a hundred small disks, is reliability. In a disk storage device consisting of many disk drives, there is a much higher probability that one of the drives will fail making the device inoperable. However, by means of data redundancy techniques, the reliability of RAID products can be substantially improved.

RAID products typically use parity encoding to survive and recover from disk drive failures. Different levels of RAID organizations using parity encoding are currently known, see "A case for redundant arrays of inexpensive disks" David A. Patterson et al., Report No. UCB/CSD 87/891, December 1987, Computer Science Division (EECS), Berkeley, Calif. 94720. Parity data are generated by XORing data to be written with previously stored data and previously stored parity data. RAID parity protection suffers from the inherent problem that the number of I/O requests, read and writes, that must be serviced to write data are many more than would be the case with non-RAID disks.

Striping and caching are well-known techniques to improve the I/O throughput in RAID products using parity protection. Striping involves the concurrent transfer of a "stripe" of data to and from disk drives. With striping, an I/O request to transfer a stripe of data is distributed over a group of disk drives, that is, each of the disk drives transfers generally concurrently, a block of the data. For example, if there are 5 disk drives in the array, and if a stripe is defined to include 5 blocks, the entire stripe can be written to the disk drives in about 1/5th the amount of time if one block of the stripe is written to each of the disk drives concurrently.

Striping is typically used in combination with a memory buffer cache or "cache" to take advantage of the principles of locality of reference, which are well known in computer programming. These principles indicate that when data stored at one location are accessed, there is a high probability that data stored at physically adjacent locations will be accessed soon afterwards in time. By having a cache the number of physical I/O transfers are reduced since there is a high probability that the requested data are already stored in the cache.

However, in RAID products the process of writing data and parity data to the disk drives is still exceptionally tedious. In a one dimensional parity protection scheme, which is the simplest form of parity protection, one parity block is generated for each stripe. The parity block for a particular stripe is generated by XORing the data stored in a block with the data stored in the other blocks of the stripe. Typically, the parity block of a stripe is written to a different disk drive than the ones which store the data blocks of the stripe. Thus, should one of the disk drives fail, the data can be recovered, stripe by stripe, from the parity block and the blocks stored on the surviving disk drives. Similarly, any parity block stored on a failed drive can easily be regenerated from the data blocks on the surviving drives.

The process of writing a new data block generally involves the following steps: a) reading the old data block which is going to be replaced by the new data block; b) reading the old parity block for the stripe that contains the new data block; c) generating new parity data from the old data, the old parity data, and the new data; d) writing the new data block; and e) writing the new parity block.

In other words, at the time that new data are written to the disk drive, traditional RAID products typically require four I/O requests to write a single block of data, retarding actual host I/O throughput.

Therefore, it is desirable to provide a system for RAID which reduces the impact of having to process additional I/O requests to generate parity data at the time that new data is written a disk drive.

SUMMARY OF THE INVENTION

The present invention provides a system which improves the I/O performance of a computer system including a central processor unit or "host", an array of disk drives and a memory buffer cache. The disk drives store data in stripes, each stripe includes a plurality of data blocks and a parity block for storing parity data generated from the data blocks. The cache stores data read from, and data to be written to the disk drives. The cache is organized into blocks compatible with the block structure of the disk drives. The blocks in cache are managed in a least recently used (LRU) manner. A low and a high threshold signal are provided to indicate the relative fullness of the cache.

The system for prefetching data blocks and parity blocks uses the low and high threshold signals to determine whether or not to prefetch the data and the parity blocks for blocks to be written. If the low threshold signal is detected, a prefetch procedure is started to read the blocks of a stripe necessary to generate parity data. That is the data blocks stored in cache are traversed in a LRU order, and for each data block in cache to be written to the disk drive, the block to be overwritten and the corresponding parity block of the stripe are read into cache. Each block which has been prefetched is marked as such. Prefetching continues, until the high threshold signal is detected. The high threshold signal causes the blocks in cache to be written to the disk drives in LRU order, until sufficient blocks have been written to disk to disable the low threshold signal.

DETAILED DESCRIPTION OF THE PREFERRED EMBODIMENT

Figure 1:
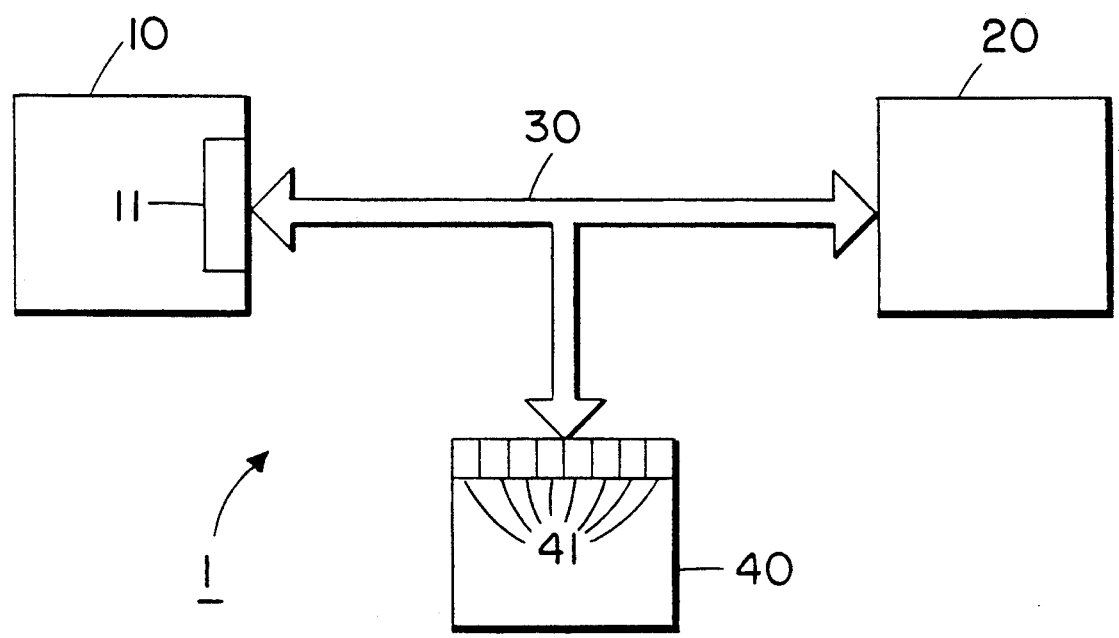
FIG. 1 is a block diagram of a computer system and RAID configuration encompassing the present invention.

Referring now to the drawings, FIG. 1 shows a computer system generally indicated by reference numeral 1. The computer system 1 includes a central processor unit or "host" 10 having primary temporary data storage, such as memory 11, and secondary permanent data storage, such as a disk device 20. The host 10 and the disk device 20 are connected by a communication bus 30. The computer system 1 also includes a memory buffer cache (cache) 40 also connected to the system bus 30.

The host 10 is generally conventional and is of the type that supports a multiple number of concurrent users executing a wide variety of computer applications, including database applications which use the disk device 20 for storing data. During operation of the computer system, the host 10 issues I/O requests, such as reads and writes, to transfer data between memory 11 and the disk device 20 via the bus 30. For purposes of illustrations only, and not to limit generality, this invention will be described with reference to its use in the disk device 20 which is organized as a RAID device as described in the Patterson et al. paper. However, one skilled in the art will recognize that the method of the invention may also be used in storage devices organized in different manners.

Figure 2:
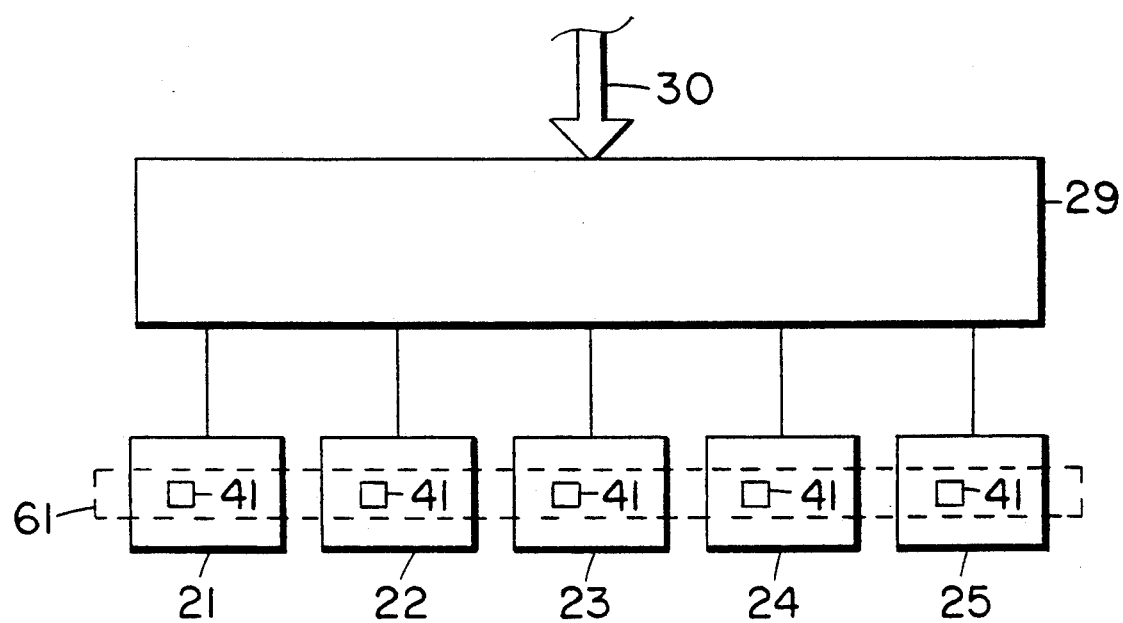
FIG. 2 is a block diagram of the RAID configuration of FIG. 1.

FIG. 2 shows, in schematic block diagram form, a disk device 20 organized in a RAID fashion as described in the Patterson et al. paper. The disk device 20 comprises a controller 29 connected to the system bus 20, and a plurality of, for example five, disk drives 21-25.

The storage space of the disk drives 21-25 is physically organized into, for example, sectors, tracks, and cylinders. However, in order to simplify access by the host 10, the storage space of the disk drives 21-25 is also organized into a set of sequentially numbered logical blocks, generally indicated by reference numeral 41. By using logical blocks 41, the details of the physical organization of the disk drives 21-25, for example, the number of sectors per track, the number of tracks per cylinder, and the physical distribution of all data across the drives 21-25, do not need to be known by the users of the host 10. In the preferred embodiment, a block of data is equal to the amount of data that can be conveniently transferred between the host 10 and the disk drives 21-25 with a single I/O request, for example, a single or multiple number of sectors.

To improve the I/O throughput of the disk device 20, the data are further organized into yet larger sections of data, known as "stripes," generally indicated by reference numeral 61. Striping techniques are well known in RAID devices, and generally involve the generally concurrent reading and writing of data to several disk drives. With striping, a host distributes the data transfer across several or all of the disk drives 21-25. In the preferred embodiment, the stripe 61 is equal to the amount of data that is transferred when one block 41 is transferred for each of the disk drives 21-25, for example five blocks 41.

Now, RAID type devices which include a large number of disk drives have a fairly high probability that one of the disk drives in the array will fail. Therefore, parity encoding is typically used to recover data that may be lost due to a disk drive failure. For example, one of the blocks 41 of a stripe 61, the "parity block," stores parity data. The parity data in the parity block is generated, for example, by taking the exclusive OR (XOR) of the blocks 41. To ensure data recovery, the parity block is usually stored on a disk drive different than one which stores a data block of the stripe from which the parity data is generated. In RAID level 5, as described in Patterson et al., the parity blocks are interleaved among all of the disk drives 21-25 to lessen contention for any one of the drives.

To take further advantage of the principles of locality of reference, the computer system 1 is provided with the memory buffer cache (cache) 40. Presumably, the host 10 can access data stored in a semiconductor cache considerably faster than data stored on the disk drives 21-25. Data frequently used by the host 10 are retained in cache 40 for as long as possible to decrease the number of physical I/O requests to transfer data between the host 10 and the disk drives 21-25, and also to allow data aggregation prior to writing data to the disk drive 21-25.

Accordingly, and again with reference to FIG. 1, the computer system 1 further includes the cache 40. In the preferred embodiment, the cache 40 comprises, for example, 4 megabytes (MB) of random access memory. Host 10 I/O read requests transfer "old" data from the disk drives 21-25 to the cache 40, and from the cache 40 to the memory 11. Host 10 I/O write requests store modified or "new" data in the cache 40, and physical I/O write requests transfer the new data from the cache 40 to the disk drives 21-25, generally some time thereafter. While the new data are stored in the cache 40, that is, before the new data are written to permanent storage on the disk drives 21-25, the new data are vulnerable to corruption due to, for example, power or system failures. For this reason, the cache 40 is relatively expensive non-volatile memory. Memory space in the cache 40 for storing new data is allocated to the users in quantities equal to the size of a block 41.

For some applications, for example database applications, where the amount of data read is much larger than the amount of data that is written, it may be advantageous to partition the cache 40 into a larger read cache and a smaller write cache. That portion of the cache 40 which is used for storing data read from the disk drives 21-25 can be of less expensive volatile memory, since the data, in case of a failure, can easily be restored from the disk drives 21-25.

In any case, the limited amount of memory of the cache 40 is typically managed in a least recently used manner (LRU). LRU algorithms are well-know in computer programming, and can be implemented in any number of ways. In general, an LRU algorithm deallocates memory space in aged order. That is, memory space storing data which were least recently used (LRU) is deallocated and made available for other uses before memory space storing data which were most recently used (MRU), used meaning any access, read or write to the data. In the case of deallocation of new data, that is, data not yet stored on the disk drives 21-25, deallocation involves the step of writing the data to disk.

Figure 3:
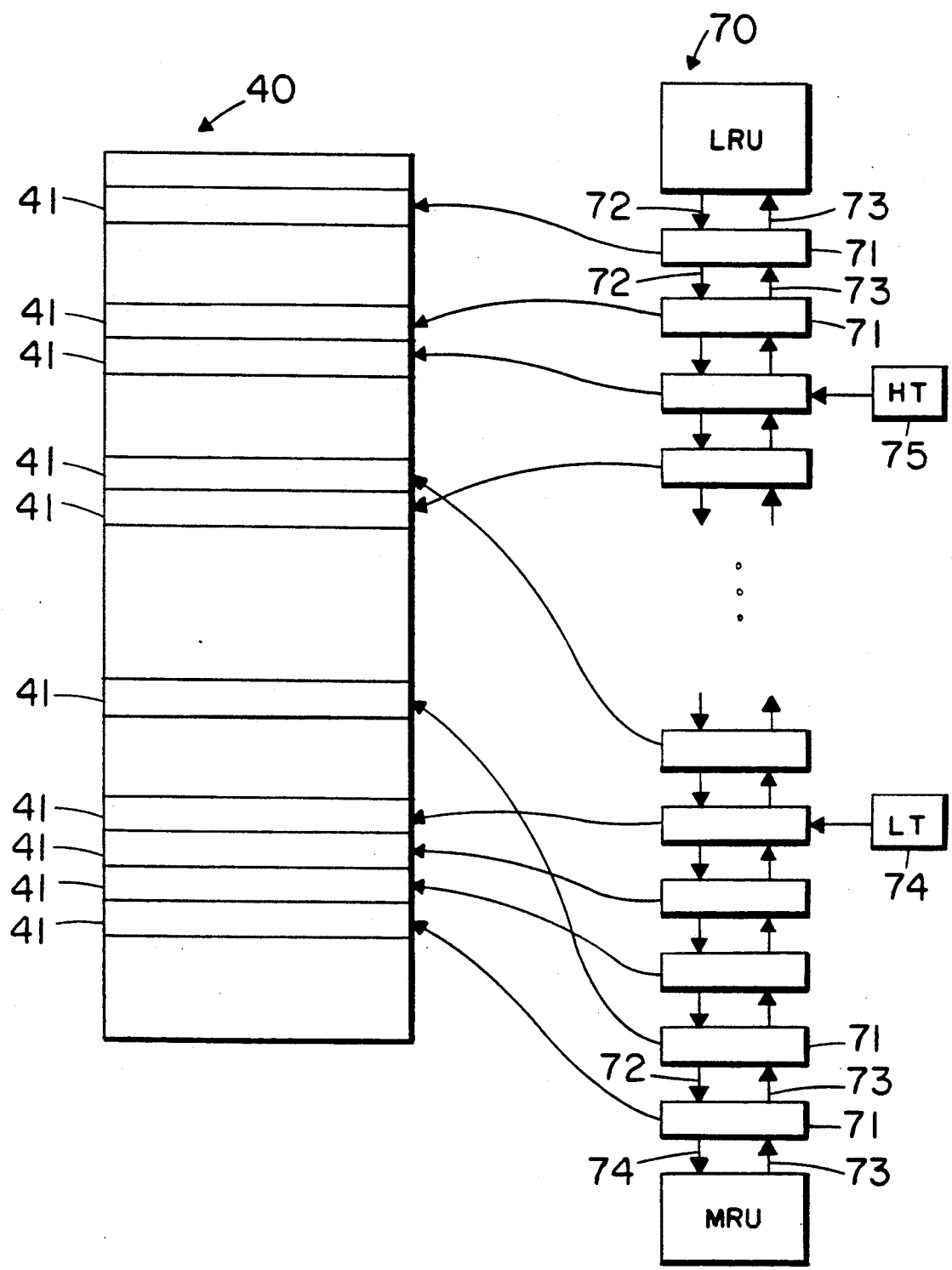
FIG. 3 is a block diagram of a LRU list according to a preferred embodiment of the invention.

In general, an LRU algorithm is implemented by means of a LRU list 70, as shown in FIG. 3. The LRU list 70 is nothing more than an ordered set of entries 71, each entry 71 referencing an allocatable amount of cache memory space, for example, blocks 41. The entries 71 are logically sequenced in the LRU list 70 in aged order by means of entry links 72 and 73. The entry links 72 each reference the next LRU entry 71, and the entry links 73 reference the previous MRU entry 71.

In addition, in order to monitor the amount of cache 40 that is allocated to active use, a low threshold signal (LT) 73 and a high threshold signal (HT) 74 are provided as follows. When the cache 40 reaches a predetermined first level of fullness, for example 80% full, the HT 71 is generated. When the cache 40 reaches a predetermined second level of fullness, for example 90% full, the LT 75 is generated.

Appropriate corrective procedures are invoked when the cache 40 reaches the first and second level of fullness. One procedure that is started when the cache 40 is filled to the first level of fullness is an opportunistic data and parity prefetch procedure which reads data and parity blocks required for parity generation for any blocks 41 about to be written. When the cache 40 is filled to the second level of fullness, sufficient blocks 41 are deallocated, in the LRU order, to disable the low threshold signal LT 74.

Deallocation of blocks 41 to be written to the disk drives 21-25 requires the generation of parity data. As previously stated, in order to generate parity information, generally involves the steps of: a) reading the old data block from the disk drive, that is the data block that will be replaced by the new data block stored in cache; b) reading the old parity block from the disk drive; c) generating the new parity block by XORing the old data block with the old parity block and the new data block; d) writing the new data block; and e) writing the new parity block.

The prefetch procedure, according to one embodiment of the invention, reads the old data and parity blocks for any blocks 41 in the cache 40 which store new data to be written to the disk drives, before the new data block is aged as the LRU block, thereby minimizes the effect of steps a) and b) above. The prefetch procedure uses the "fullness" of the write cache 40 to determine when to prefetch old data blocks and old parity blocks.

As new data blocks 41 are added to the cache 40, the LT 74 and HT 75 are provided when the first and second level of fullness are reached. The prefetch procedure is involked at a lower processing priority, when the cache 40 reaches the first level of fullness. That is, when the LT 74 is detected after the first level of fullness has been exceeded, the prefetch procedure is started. The procedure determines, for each entry 71 in the LRU list 70 in LRU order, if the corresponding old data block and old parity block are stored in the cache 40. If they are not, the prefetch routine reads the old data block and the old parity block into the cache 40 and marks them as prefetched.

In other words, the prefetch routine opportunistically uses any available processor time, prior to new data being written, to execute anticipated I/O requests during periods of relatively low processor activity, reducing the I/O demand during peak write load, and yielding lower write latency and better write throughput.

Figure 4:
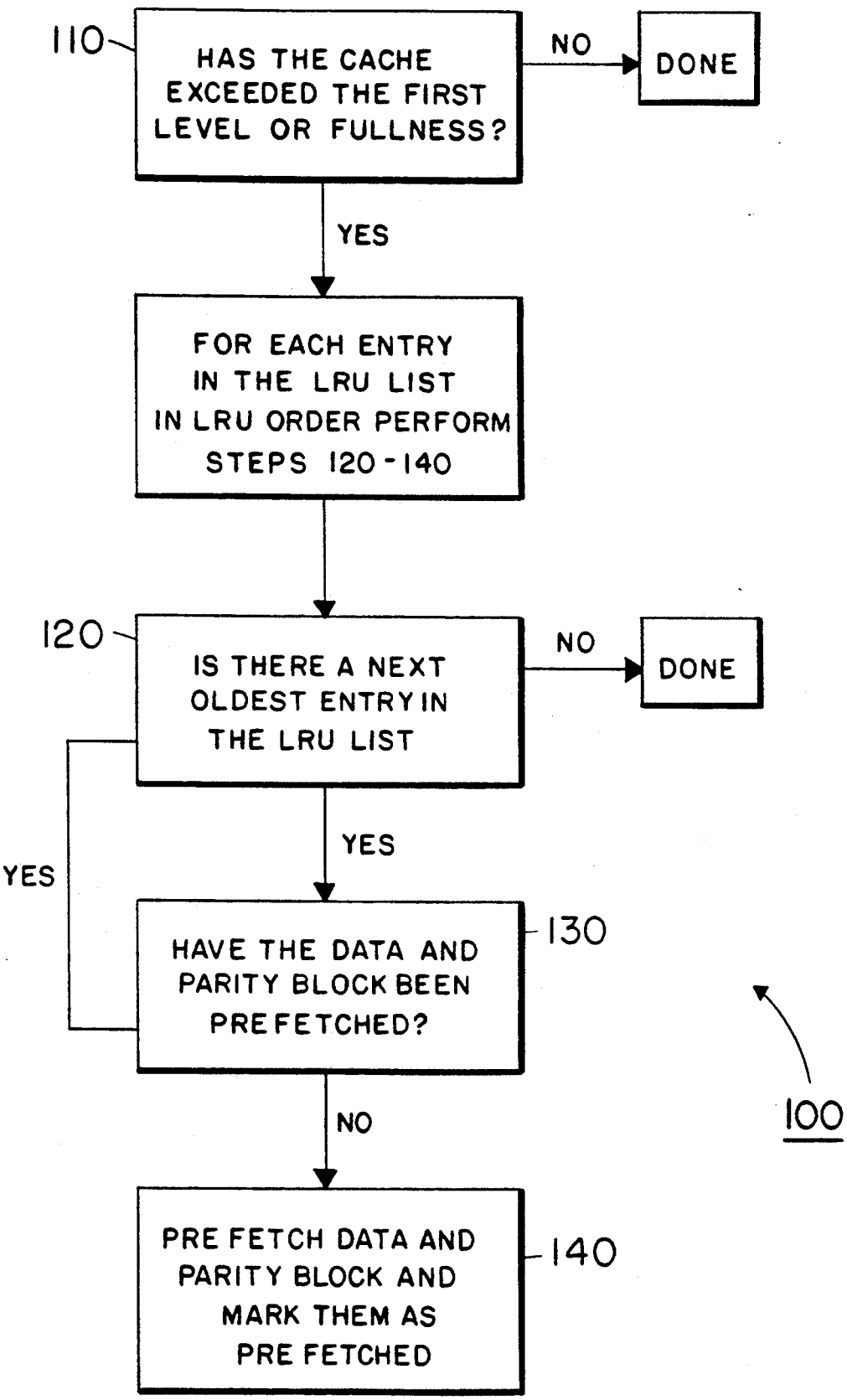
FIG. 4 is a flow chart of a method to prefetch data and parity blocks in anticipation of writing data to the RAID configuration of FIG. 2.

In FIG. 4, there is shown a flow chart of a prefetch procedure 100, according to one embodiment of the invention, for prefetching data blocks and parity blocks. In step 110, the computer determines if the cache 40 has exceeded the first level of fullness. That is, is the low threshold signal LT 74 present.

If the answer is no, that is, the LT 74 is not present, or the cache 40 has not exceeded a first level of fullness, the procedure 100 is done, otherwise, for each entry 71 in the LRU list 70, in LRU order, beginning with step 120 processing the steps 120-140 at a lower processor priority.

In step 120, the computer determines if there is a next oldest entry 71 in the LRU list 70. If there is not, the procedure 100 is done, otherwise perform step 130.

In step 130, the computer determines if the data and parity blocks corresponding to the next entry 71 have been prefetched.

If the answer in step 130 is yes, that is, the data and parity blocks have been prefetched continue with step 120, otherwise in step 140, read the data and parity blocks, and mark them as prefetched. Then proceed with step 120.

Thus, the procedure minimizes the impact of the extra I/O requests required to generate parity data for the stripe 61 at the time that a block of data is to be written to the device 20.

When the cache 40 reaches the second level of fullness, the high threshold signal HT 75 is generated. This signal causes blocks 41 to be deallocated from the cache 40 until sufficient blocks 41 have been deallocated to cause the cache 40 to be full to a level below the first level of fullness. Since the all of the associated blocks 41 necessary to generate parity data have been prefetched, the number of I/O requests at the time of deallocation is greatly reduced, thereby improving the system performance.

While there has been shown and described a preferred embodiment, it is understood that various other adaptations and modifications may be made within the spirit and scope of the invention.

What is claimed:

1. An apparatus for prefetching data from a plurality of disk drives, each of the plurality of disk drives organized into a plurality of disk blocks, the plurality of disk blocks further organized into a plurality of stripes, each of the plurality of stripes including at least one disk block from each of the plurality of disk drives, each of the plurality of stripes further including a parity disk block storing parity data generated from the data stored in the other disk blocks of the stripe, the apparatus comprising:

memory means for storing data, said memory means partitioned into memory blocks compatible with the disk block organization of the plurality of disk drives;

means for maintaining said memory blocks in a least recently used (LRU) order;

means for generating a low threshold signal in response to a first predetermined number of said memory blocks being filled with data; and means, responsive to said low threshold signal, for starting a prefetch procedure to read disk blocks associated with a predetermined stripe, said predetermined stripe including at least one disk block to be overwritten by a LRU memory block.

2. The apparatus as in claim 1 wherein said disk blocks associated with said predetermined stripe include the parity disk block of said predetermined stripe and said at least one disk block to be overwritten by said LRU memory block.

3. The apparatus as in claim 1 further including means for marking said LRU memory block as being prefetched.

4. The apparatus as in claim 1 further including means for generating a high threshold signal in response to a second predetermined number of said memory blocks being filled with data, said second number being greater than said first number; and means for generating parity data from said LRU memory block, said at least one disk block to be overwritten, and the parity disk block; and means for storing said parity data in a parity memory block; and means for writing said LRU memory block and said parity memory block to said plurality of disk drives.

5. The apparatus as in claim 1 further including means for reading disk blocks associated with a second predetermined stripe, said second predetermined stripe including at least one disk block to be overwritten by a next LRU memory block.

6. A method for prefetching data from a plurality of disk drives, each of the plurality of disk drives organized into a plurality of disk blocks, the plurality of disk blocks further organized into a plurality of stripes, each of the plurality of stripes including at least one disk block from each of the plurality of disk drives, each of the plurality of stripes further including a parity disk block storing parity data generated from the data stored in the other disk blocks of the stripe, the method comprising the steps of;

storing data in a memory means, said memory means partitioned into memory blocks compatible with the disk block organization of the plurality of disk drives;

maintaining said memory blocks in a least recently used (LRU) order;

generating a low threshold signal in response to a first predetermined number of said memory blocks being filled with data; and starting, in response to said low threshold signal, a prefetch procedure to read disk blocks associated with a predetermined stripe, said predetermined stripe including at least one disk block to be overwritten by a LRU memory block.

7. The method as in claim 6 further including the steps of reading the parity disk block of said predetermined stripe, and reading said at least one disk block to be overwritten by said LRU memory block.

8. The method as in claim 6 further including the step of marking said LRU memory block as being prefetched.

9. The method as in claim 6 further including the step of generating a high threshold signal in response to a second predetermined number of said memory blocks being filled with data, said second number being greater than said first number; and generating parity data from said LRU memory block, said at least one disk block to be overwritten, and the parity disk block; and storing said parity data in a parity memory block; and writing said LRU memory block and said parity memory block to said plurality of disk drives.

10. The apparatus as in claim 6 further including reading disk blocks associated with a second predetermined stripe, said second predetermined stripe including at least one disk block to be overwritten by a next LRU memory block.

* * * * *